INVENTOR.
Raymond G. Brownstein
BY
William J. Ruano
ATTORNEY

Jan. 1, 1963 R. G. BROWNSTEIN 3,071,397
ROTARY AIR CONNECTION
Filed April 27, 1959 3 Sheets-Sheet 2
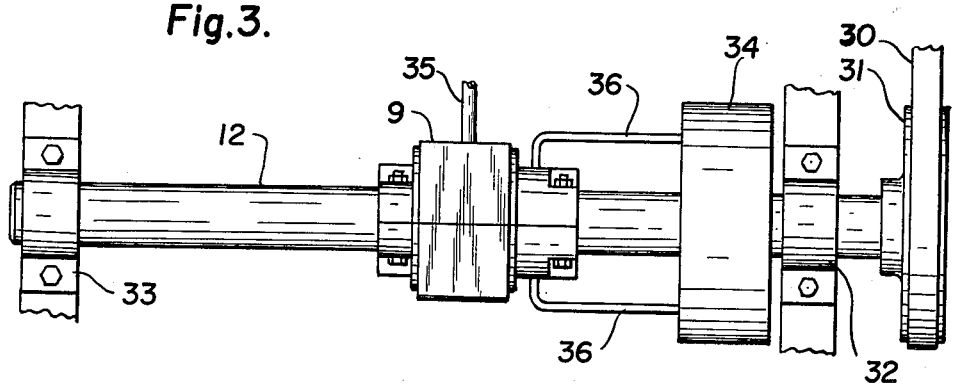
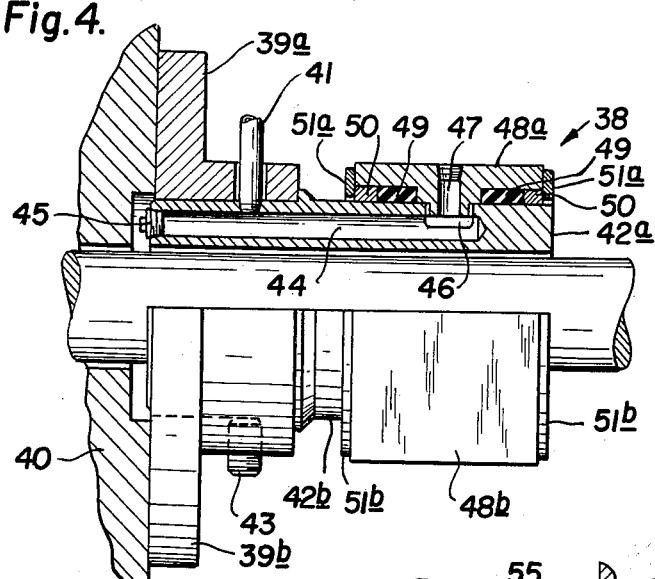
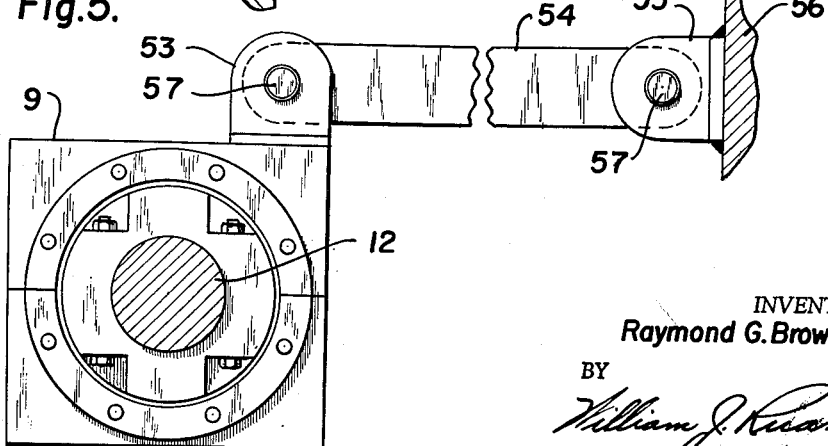
INVENTOR.
Raymond G. Brownstein
BY
William J. Ruano
ATTORNEY Jan. 1, 1963 R. G. BROWNSTEIN 3,071,397
ROTARY AIR CONNECTION Filed April 27, 1959 3 Sheets-Sheet 3

INVENTOR.
Raymond G. Brownstein
BY
ATTORNEY

United States Patent Office 3,071,397
Patented Jan. 1, 1963

3,071,397
ROTARY AIR CONNECTION
Raymond G. Brownstein, Ellwood City, Pa., assignor to Charles J. Rubrecht, Allison Park, Allegheny County, Pa.
Filed Apr. 27, 1959, Ser. No. 809,022
5 Claims. (Cl. 285—190)

This invention relates to a rotary air connection or midshaft air connection or, more particularly, to a rotary air connection for the purpose of delivering air from a stationary source to a rotating, air-operated mechanism, such as an air clutch, air brake, or other device.

In conventional types of air connections for air clutches and air brakes, usually air is supplied to a mid-shaft clutch or other device by mounting a rotary air connection on the end of the shaft and conducting the air to the clutch by means of a very deep, longitudinally extending hole in the shaft that extends to the vicinity of the clutch and is connected thereto by means of flexible hoses tapped to radial holes in the shaft connected to the deep hole. This not only involves a costly machining operation but the various holes in the shaft greatly weaken the shaft and reduce its torque capacity.

An object of this invention is to provide a rotary air connection that is devoid of the above named disadvantages, and which eliminates the necessity of forming holes in the shaft which would weaken it.

A further object of this invention is to provide a rotary air connection that may be made to an intermediate portion of a shaft, between bearings or housings, and which is of relatively simple and inexpensive construction and which may be easily and quickly assembled and the parts of which may be easily replaced.

A still further object of the invention is to provide a rotary air connection which provides a direct connection to an air operated mechanism and which is devoid of long flexible elements subject to breakage or leakage and which is leak-proof and highly reliable in operation.

Other objects and advantages of the invention will become more apparent from a study of the following description taken with the accompanying drawings wherein:

FIG. 3 is an elevational view showing, somewhat schematically, a complete assembly illustrating how the present invention may be applied to a rotary clutch;

FIG. 4 shows a modified form of rotary air connection in which the inner member is stationary instead of rotatable as in FIGS. 1 and 2;

FIG. 5 shows a stabilizing bar attachment secured to the rotary air connection shown in FIGS. 1 and 2.

Since the rotary air connection embodying the principles of the present invention is mounted on an intermediate portion of a drive shaft located between housings or bearings, it must be split for assembly. Therefore, all the component parts are in halves, but by proper machining, the various parts of the assembly, when in position on the shaft, operate as one piece. The rotary air connection can be manufactured without special machine tools and from readily available materials.

Figure 1:
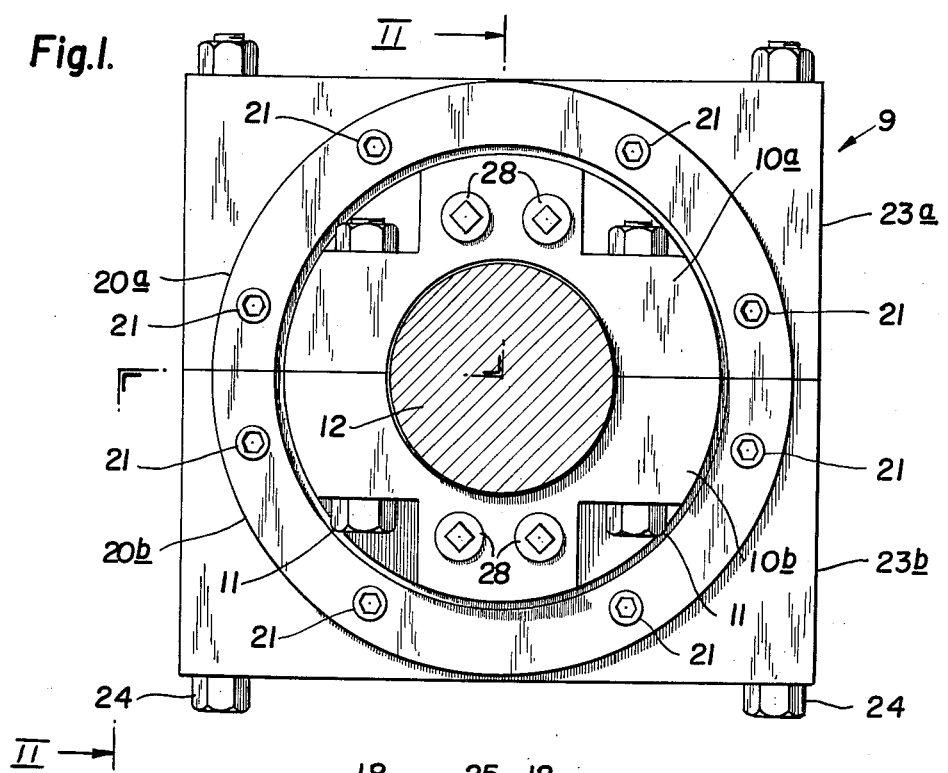
FIG. 1 is an end elevational view of a rotary air connection embodying the principles of the present invention.
Figure 2:
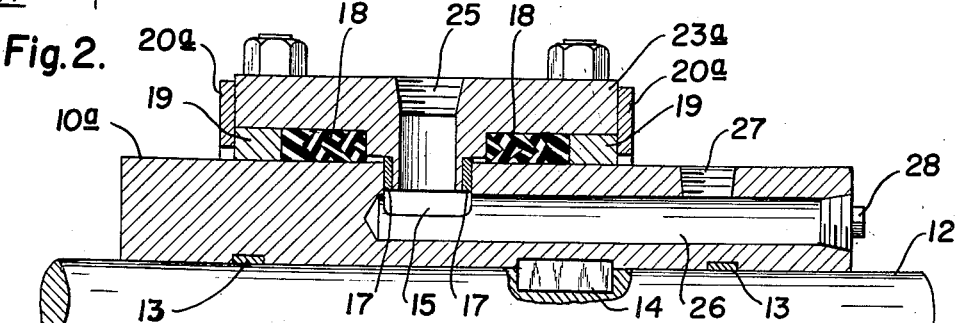
FIG. 2 is a longitudinal, cross-sectional view taken along line II—II of FIG. 1.

Referring more particularly to FIGS. 1 and 2 which shows the preferred form of rotary air connection 9, numeral 12 denotes a rotary drive shaft on which may be rigidly mounted a rotatable or rotary element 10a, 10b to supply an air clutch or brake (not shown). Clamped onto shaft 12 by means of bolts 11 is the rotary member comprising a top half 10a and a lower half 10b which are secured together by said bolts 11 so as to form a unitary, rotary construction. A sliding fit clearance is provided between the rotary member 10a, 10b and shaft 12. And in view of such clearance, rubber-like compression rings 13 are seated in annular grooves formed in the shaft 12 so that when the rotary member 10a, 10b is clamped onto shaft 12, the rings 13 will be squeezed, therefore any tendency for the rotary member to rattle against the shaft will be eliminated. In one half (10a) of the rotatable member, a feather keyway is machined to fit key (or dowels) 14 in shaft 12. This key serves a dual purpose, namely, it couples the shaft 12 to the rotary member 10a, 10b, so that the assembly will rotate in unison and it locates and maintains the location of the rotary member on the shaft.

An annular groove 15 is provided in the rotary member 10a, 10b which communicates with one or a plurality of longitudinally extending holes, such as 26, from which air outlets, such as 27, supply air to a clutch, brake or other air-operated device (not shown). A plug 28 closes the end of the hole and may serve as an additional outlet, if desired. Groove 15 is of such depth that it reaches the center line of the holes 26 so as to give a maximum of opening area for air to enter the holes 26 from the groove. Furthermore, the cross-sectional area of the groove 15 that is bounded by the rotating member 10a, 10b and the stationary member 23a, 23b approximates the area of the hole of air inlet 25, connected to any suitable source of compressed air, which allows unrestricted distribution of air to all outlets. The air inlet opening 25 is formed in the upper half 23a of the stationary member to which the lower half 23b is clamped by bolts 24. The radially inwardly extending or collar portion of the stationary member, in which air inlet 25 is formed, fitting into an annular groove in the rotary member also serves to maintain the longitudinal position of the outer stationary member relative to the rotating inner member 10a, 10b. Seated on each side of this collar portion is a bronze thrust washer 17. These washers serve as thrust bearings to withstand side loads that may be encountered in operation.

The inner rotatable member 10a, 10b is freely rotatable within the stationary outer member 23a, 23b. The stationary member is bored at each end to accommodate packings 18 and bushings 19 of bronze or other suitable material. The packings 18 allow the distribution of air from the stationary member 23a, 23b to the rotating member 10a, 10b without the loss of air in view of the effective seal at the mating surfaces. Bushings 19 also serve to support the stationary member 23a, 23b on the rotating member 10a, 10b and maintain a concentric operating condition for the packing 18 to insure proper surface relationships for the seals. Retaining rings 20a retain the bronze bushings 19 and packings 18 in place and are secured in place by fastening elements 21. The bronze parts 19 and 20a may be used with or without lubrication. It will be apparent that packing 18 or the bushings may be easily replaced simply by unscrewing bolts 24, thus not requiring a large clearance space. While the stationary member is shown as rectangular in outline, it will be apparent that it may be round, polygonal or of other shape.

FIG. 3 shows a typical application of the rotary air connection, described in FIGS. 1 and 2, and shows a shaft 12 mounted in bearings 32 and 33. The air inlet pipe 35 is led into the rotary air connection 9. Flexible hoses such as 36, connect the outlet holes, such as 27, to a rotatable member 34 of an air clutch. 31 and 30 are the belt and pulley of a drive pulley.

FIG. 4 shows a modification of the rotary air connection wherein the inner member 42a, 42b is stationary and the outer member 48a, 48b is rotatable. More specifically, 39a, 39b is a stationary supporting bracket and 41 is an air inlet connection leading to the longitudinal passageway 44 which leads to outlets 47 formed in rotary member 48a, 48b. The inner member 42a, 42b is stationary whereas the outer member 48a, 48b is rotatable and comprises essentially the same construction illustrated in FIGS. 1 and 2, that is, it includes packing 49, bronze bushing 50, and retaining rings 51a, 51b; also an annular groove 46.

FIG. 5 shows a stabilizing bar 54 having pivotal ends 57 secured to brackets 53 and 55 for connecting the stationary housing to a rigid wall or other stationary member 56 for supporting large sized rotary connections or for cases when a customer does not desire to use the air inlet pipe also as a stabilizer.

Figure 6:
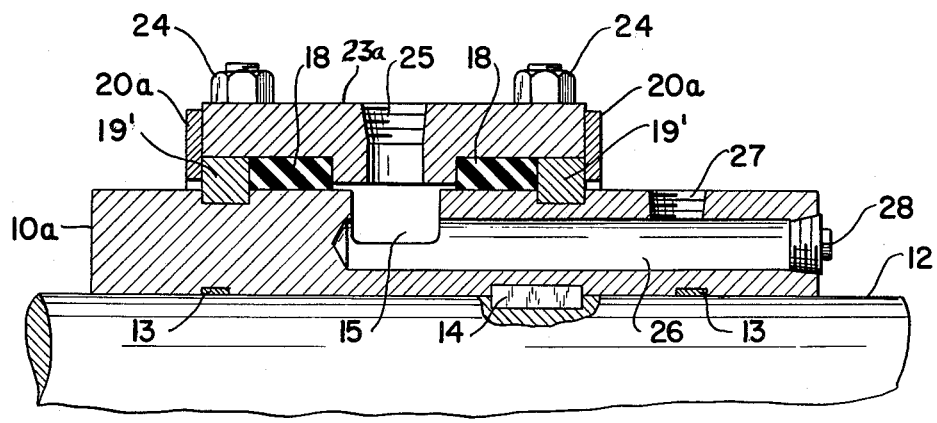
FIG. 6 shows a further modification.

FIG. 6 shows a modification which eliminates the necessity of the radially inwardly projecting collar and contacting rings 17, together with the wear produced thereby. Instead, bronze rings 19$^1$ are extending radially inwardly into correspondingly shaped grooves formed in parts 10a (and 10b) to prevent longitudinal sliding movement of parts 23a—23b relative to shaft 12. Rings 19$^1$ may, instead, be anti friction bearings, such as ball or roller bearings, to further reduce wear. Of course, FIG. 4 may be modified in the manner shown in FIG. 6.

Thus it will be seen that I have provided an efficient rotary air connection for connecting a stationary member to a rotary member, such as a rotary clutch or brake, which is of simple and inexpensive construction and which eliminates the necessity of forming grooves in a rotary shaft that would weaken it and reduce its torque capacity.

While I have illustrated and described several embodiments of my invention, it will be understood that these are by way of illustration only, and that various changes and modifications may be made within the contemplation of my invention and within the scope of the following claims.

I claim:

1. A mid-shaft rotary air connection, comprising a rotary shaft portion, a pair of semi-circular bearing members in opposed relationship, snugly surrounding said shaft portion, a longitudinally extending groove formed in one of said members and having inlet and outlet connections for conducting fluid under pressure through said groove, said outlet connection including an annular groove, a second pair of semi-circular members in opposed relationship and snugly surrounding said first pair and arranged to allow relative rotational movement between said pairs, said second pair including a radial outlet connection leading into said groove, one of said pairs being stationary and sealing means between said pairs on opposite sides of said radial outlet connection to prevent escape of fluid, said second pair of semi-circular members including a radially inwardly extending collar portion projecting into said annular groove to maintain the relative longitudinal position of one pair of semi-circular members relative to the other pair.

2. Apparatus as recited in claim 1 wherein said first pair of semi-circular members is stationary and said second pair is rotatable about said first pair.

3. A rotary air connection comprising an imperforate rotary shaft, a pair of semi-circular, opposing clamp halves rigidly clamped to an intermediate portion of said shaft and having peripheral, semi-circular grooves on their outer surfaces and containing a communicating longitudinally extending groove, a stationary member, formed of mating, semi-circular, opposed halves, surrounding and forming a slidable fit about said clamp halves, and including a radial fluid port in communication with said semi-circular grooves, and sealing means between said stationary member and clamp halves on opposite sides of said port, and an outlet port for connecting said semi-circular grooves to the rotary portion of a fluid operable device mounted on said shaft, said stationary member having a radially inwardly extending collar portion closely fitting in said semi-circular grooves to maintain the relative longitudinal position between said clamp halves and stationary member.

4. A mid-shaft rotary, fluid connection, comprising a rotary shaft portion, a hollow cylindrical member surrounding said shaft and having a peripheral, annular groove extending along its outer surface coaxially with said shaft, said member also having a longitudinal groove in communication with said peripheral groove, a screw threaded connection extending radially outwardly of said longitudinal groove adjacent the end of said member, a stationary member closely surrounding said hollow cylindrical member and acting as a bearing therefor, a second screw threaded connection extending radially outwardly of said stationary member in communication with said peripheral groove, bearing rings snugly sandwiched intermediate the end portions of said stationary member and said hollow cylindrical member, and retaining rings fastened to said stationary member for retaining said bearing rings, said stationary member having a radially inwardly extending collar portion projecting into and closely fitting said annular groove to prevent longitudinal displacement of said hollow cylindrical member and said stationary member.

5. A mid-shaft rotary, fluid connection, comprising a rotatable shaft, a hollow cylindrical member surrounding said shaft and having a peripheral, annular groove extending along its outer surface coaxially with said shaft, said member also having a longitudinal groove in communication with said peripheral groove and terminating in a screw threaded, radially outwardly extending connection, a stationary cylindrical member closely surrounding said hollow cylindrical member and acting as a sleeve therefor, said stationary cylindrical member having an air-conducting groove in communication with said peripheral groove, annular bearing members snugly sandwiched between the outer end portions of said stationary member and of said hollow cylindrical member, said stationary member including retaining ring portions at the ends of said stationary member for retaining said bearing members in place, and fastening elements extending longitudinally through said retaining ring portions and stationary member to firmly secure them together, said stationary member also including a radially inwardly extending collar portion projecting into said annular peripheral groove portion of said hollow cylindrical member to maintain the relative longitudinal position of said stationary member and said hollow cylindrical member.

References Cited in the file of this patent

UNITED STATES PATENTS

| | | |
|---|---|---|
| 757,932 | Jones | Apr. 19, 1904 |
| 842,598 | Weston | Jan. 29, 1907 |
| 932,060 | Richards | Aug. 24, 1909 |
| 1,562,669 | Weber | Nov. 24, 1925 |
| 2,450,458 | Thompson | Oct. 5, 1948 |
| 2,571,012 | Coates | Oct. 9, 1951 |
| 2,603,509 | Eskin et al. | July 15, 1952 |
| 2,777,702 | Rodal | Jan. 15, 1957 |
| 2,872,217 | May | Feb. 3, 1959 |
| 2,966,245 | Judge | Dec. 27, 1960 |